US011996639B2

(12) United States Patent
Jamaly

(10) Patent No.: US 11,996,639 B2
(45) **Date of Patent: *May 28, 2024**

(54) DUAL-POLARIZED PLANAR ULTRA-WIDEBAND ANTENNA

(71) Applicant: Swisscom AG, Bern (CH)

(72) Inventor: Nima Jamaly, Bern (CH)

(73) Assignee: SWISSCOM AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,657

(22) Filed: May 1, 2023

(65) Prior Publication Data

US 2023/0352842 A1 Nov. 2, 2023

Related U.S. Application Data

(63) Continuation of application No. 17/327,062, filed on May 21, 2021, now Pat. No. 11,641,062, which is a (Continued)

(30) Foreign Application Priority Data

Dec. 1, 2015 (EP) .................................... 15197294

(51) Int. Cl.
*H01Q 1/38* (2006.01)
*H01Q 1/48* (2006.01)
(Continued)

(52) U.S. Cl.
CPC ................ *H01Q 9/40* (2013.01); *H01Q 1/38* (2013.01); *H01Q 1/48* (2013.01); *H01Q 21/24* (2013.01); *H01Q 21/28* (2013.01); *H01Q 9/42* (2013.01)

(58) Field of Classification Search
CPC .. H01Q 9/40; H01Q 1/38; H01Q 1/48; H01Q 21/24; H01Q 21/28; H01Q 9/42
See application file for complete search history.

(56) References Cited

U.S. PATENT DOCUMENTS

| | | | | |
|---|---|---|---|---|
| 6,278,410 | B1 * | 8/2001 | Soliman | H01Q 13/10 343/769 |
| 11,024,974 | B2 * | 6/2021 | Jamaly | H01Q 9/40 |

(Continued)

FOREIGN PATENT DOCUMENTS

| | | |
|---|---|---|
| WO | 2009045219 | 4/2009 |
| WO | 2010029304 | 3/2010 |

OTHER PUBLICATIONS

"Compact CPW-fed Circular Slot Antenna for Ultra-wideband Applications", Meie Chen et al., Antennas, Propagation and EM Theory, ISAPE 2008, 8th Internationl Symposium, Nov. 2, 2008, 4 pages.

(Continued)

*Primary Examiner* — David E Lotter
(74) *Attorney, Agent, or Firm* — McAndrews, Held & Malloy, Ltd.

(57) ABSTRACT

Methods and systems are provided for implementing and utilizing dual-polarized planar ultra-wideband antennas. A planar antenna may include a substrate, a monopole conductor, a first ground conductor, and a second ground conductor. The monopole conductor is connected to a first signal feeding line. The first ground conductor is connected to ground potential. The first ground conductor is further connected to a second signal feeding line. The second ground conductor is connected to ground potential. The second ground conductor is located on a side of the substrate.

16 Claims, 4 Drawing Sheets

Related U.S. Application Data continuation of application No. 15/780,483, filed as application No. PCT/EP2016/079268 on Nov. 30, 2016, now Pat. No. 11,024,974.

(51) Int. Cl.

| | |
|---|---|
| ***H01Q 9/40*** | (2006.01) |
| ***H01Q 21/24*** | (2006.01) |
| ***H01Q 21/28*** | (2006.01) |
| *H01Q 9/42* | (2006.01) |

(56) References Cited

U.S. PATENT DOCUMENTS

| | | | | |
|---|---|---|---|---|
| 11,641,062 | B2 * | 5/2023 | Jamaly | H01Q 21/28<br>343/846 |
| 2005/0062670 | A1 * | 3/2005 | Suh | H01Q 9/28<br>343/828 |
| 2009/0213016 | A1 | 8/2009 | Teshima | |
| 2010/0136912 | A1 * | 6/2010 | Mohammadian | H01Q 1/242<br>343/702 |
| 2010/0219981 | A1 | 9/2010 | Mohammadian | |

OTHER PUBLICATIONS

"Printed Circular Ring Antenna for UWB Application", Azim Rezaul et al., Electrical and Computer Engineering, 2010 International Conference, Dec. 18, 2010, pages.

"Novel Dual-Polarized Planar Ultrawideband Monopole Antenna", Steven Preradovic, Antennas and Wireless Propogation Letters, vol. 13, Apr. 29, 2014, 4 pages.

International Search Report for PCT/EP2016/079268, dated Feb. 16, 20217, 3 pages.

* cited by examiner

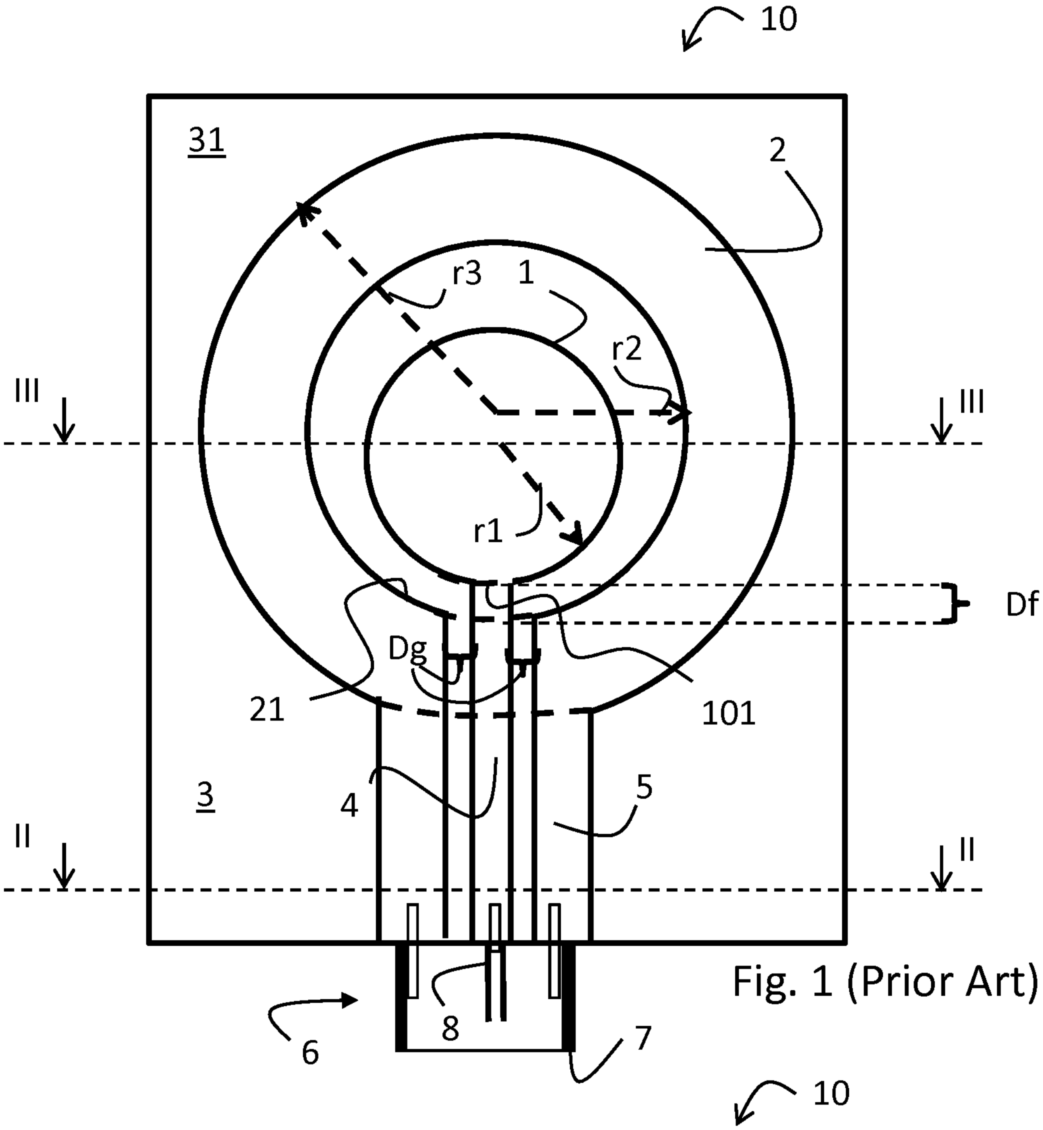
Fig. 1 (Prior Art)
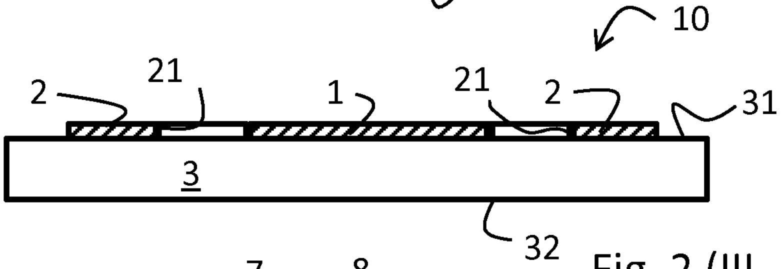
Fig. 2 (III –III)
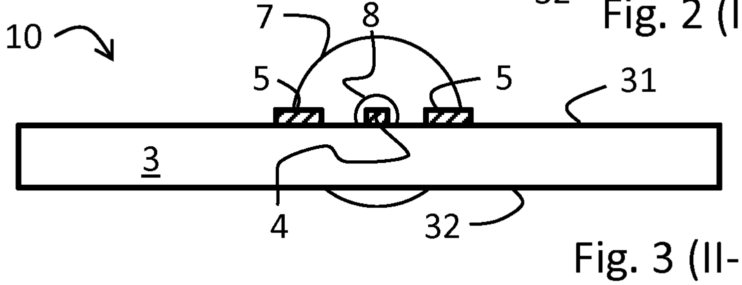
Fig. 3 (II-II)

Fig. 4
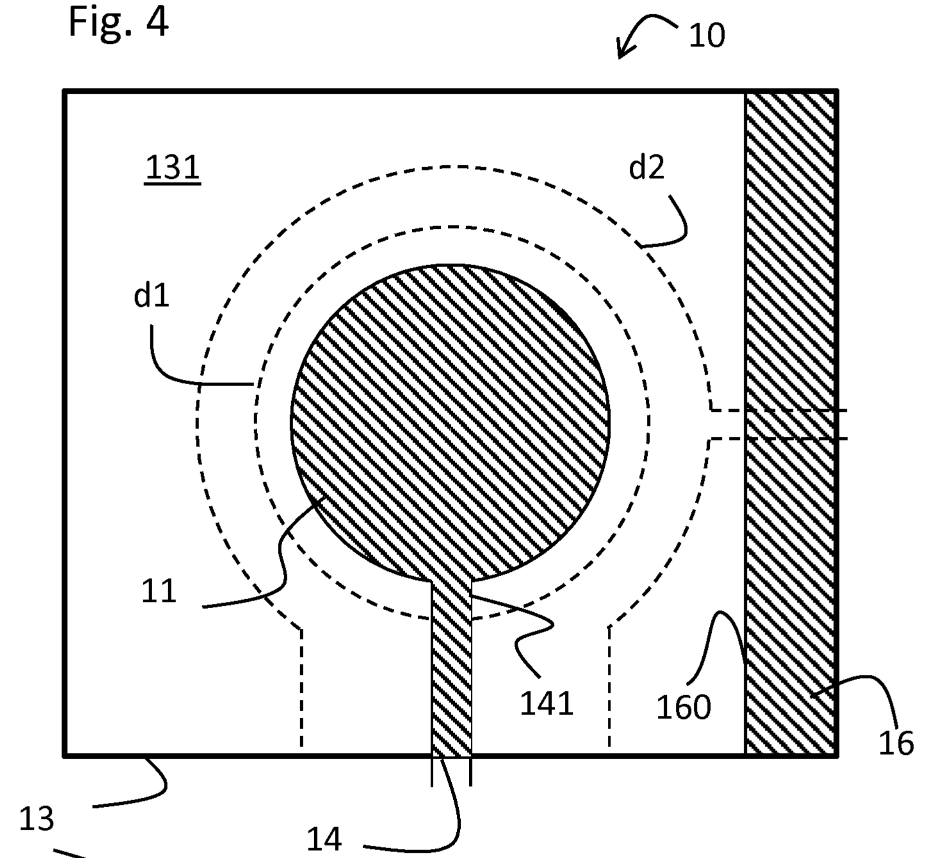
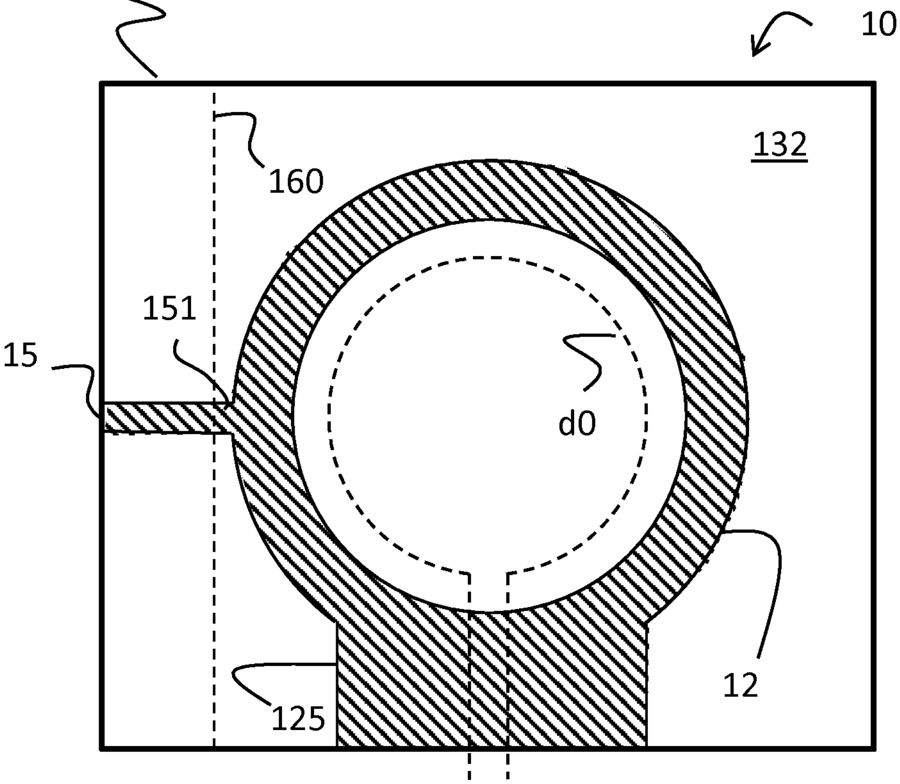
Fig. 5

DUAL-POLARIZED PLANAR ULTRA-WIDEBAND ANTENNA

CLAIM OF PRIORITY

This patent application is a continuation of U.S. patent application Ser. No. 17/327,062, filed on May 21, 2021, which is a continuation of U.S. patent application Ser. No. 15/780,483, filed on May 31, 2018, which is the United States national stage entry application of International Application Serial No. PCT/EP2016/079268, filed on Nov. 30, 2016, which in turn claims priority from European Patent Application Serial No. 15197294.0, filed on Dec. 1, 2015. Each of the above identified applications is hereby incorporated herein by reference in its entirety

FIELD OF THE INVENTION

The present invention relates to an antenna, more specifically to a compact and planar antenna operable in the GHz range as used for example in wireless communication.

DESCRIPTION OF RELATED ART

A theoretical monopole antenna includes a monopole arranged perpendicular to a nominally infinite or nearly infinite ground plane. There are also approximately planar monopole antennas known where the nominally infinite ground plane is arranged coplanar to a monopole, both mounted onto the surface of a (dielectric) substrate. The driven or active element of the monopole antenna is linked to other parts of a transmitting and/or receiving device by a signal feeding line which can be implemented as a planar waveguide with the central conductor or signal feeding line shielded on both sides by ground feeding lines. In many designs the driven element of a monopole antenna has an increased width compare to the width of the signal feeding line connecting it to the rest of the antenna components. For example the driven element of a monopole antenna could flare into a triangular shape or widen into a circular, rectangular, or other shape from a feeding point of the antenna. This widening is normally created for the purpose of having wider bandwidth, see for example "Compact Wideband Rectangular Monopole Antenna for Wireless Applications" by S. M. Naveen et al, Wireless Engineering and Technology, 2012, 3, 240-243 http://dx.doi.org/10.4236/wet.2012.34034 Published Online October 2012.

Further antenna designs are described for example in: "Coplanar Waveguide Fed Ultra-Wideband Antenna Over the Planar and Cylindrical Surfaces" by from R. Lech et al. as published in The 8th European Conference on Antennas & Propagation, 2014 (EuCAP 2014), Hague, Netherlands, 6-11 Apr. 2014, pp. 3737-3740.

It should be understood that the above referenced documents show only some examples of known designs and a great variety of others are described in the published literature. But whilst the general principles of designing such antenna are known it continues to be an objective to derive more compact and more capable antenna to satisfy for example the demand for smaller mobile and stationary communication devices, such as phones, routers, relay station and the likes. It is further seen desirable to design new compact antennas to support MIMO (multiple in/multiple out) communication modes.

BRIEF SUMMARY OF THE INVENTION

A wideband compact antenna is provided suited for MIMO communication and other purposes, substantially as shown in and/or described in connection with at least one of the figures, and as set forth more completely in the claims.

These and other advantages, aspects and novel features of the present invention, as well as details of an illustrated embodiment thereof, will be more fully understood from the following description and drawings.

BRIEF DESCRIPTION OF THE DRAWINGS

The invention will be better understood with the aid of the description of an embodiment given by way of example and illustrated by the figures, in which:

FIG. 1 shows a top view of an antenna of the prior art;

FIG. 2 shows a cross-section II-II of FIG. 1;

FIG. 3 shows a cross-section III-III of FIG. 1;

FIG. 4 shows an exemplary top view of an antenna according to an example of the invention;

FIG. 5 shows a bottom view of the antenna of FIG. 4;

DETAILED DESCRIPTION

Figure 6:
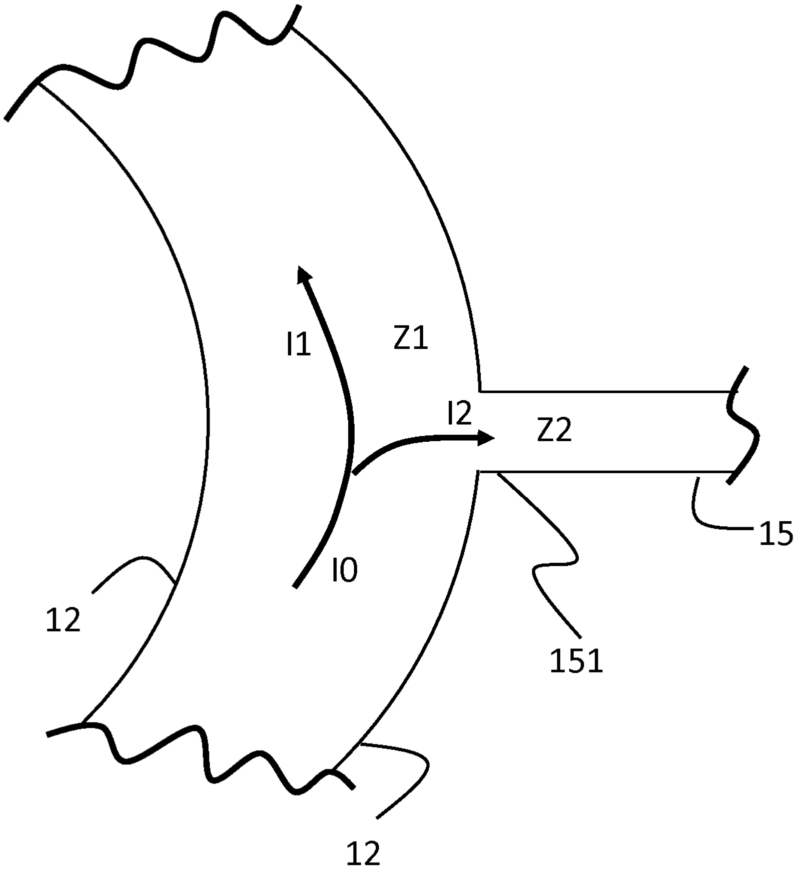
FIG. 6 shows a detail of FIG. 5.

A typical planar antenna 10 is shown in FIG. 1 to FIG. 3. FIG. 1 shows a top view, while FIG. 2 shows the cross-sectional view II-II and FIG. 3 shows the cross-sectional view III-III. The ground plane in this arrangement is formed by a circular ring-shaped ground conductor 2 surrounding an inner area. A circular monopole conductor 1 is mounted onto the substrate 3 within the inner radius r2 of the ground conductor 2. Both are arranged coplanar on the same side 31 of a substrate 3 while the opposite side 32 of the substrate is free of conducting structures.

The circular monopole conductor 1, which may be considered to form the driven or active element of the antenna 10, may be electrically coupled to transmit/receive circuitry (not shown) via the signal feeding line 4 and a central pin 8 of a coaxial connector 6. The ground conductor 2 is similarly electrically coupled to ground of the transmit/receive circuitry by the ground feeding lines 5 and the shielding 7 of the coaxial connector 6. The ground conductor 2 and the ground connector lines 5 shield the signal feeding line 4 coupled to the monopole conductor 1 arranged in the opening of the ring-shaped ground conductor 2. The antenna characteristics depend mainly on the separation distance between the ground conductor 2 and the monopole conductor 1, particularly on the following geometrical parameters: the radius r1 of the monopole conductor 1, the outer radius r3 and the inner radius r2 of the ring-shaped ground conductor 2, the distance Df of the feeding point 101 of the monopole conductor 1 to the inner border 21 of the ring-shaped ground conductor 2 and the distance Dg between the signal feeding line 4 to the ground connector lines 5 on both sides. The feeding point 101 of the monopole conductor 1 is defined as the point at which the monopole conductor 1 begins to widen from the (e.g. constant) width of the signal feeding line 4. In other words, the feeding point 101 can be understood as the point at which there is the transition from the signal feeding line 4 into the monopole conductor 1, since the feeding line 4 and the monopole conductor 1 are often one physical conductor/component.

FIGS. 4 and 5 are schematic illustrations of an embodiment of antenna 10 according to an example of the invention. FIG. 4 shows a top view of the embodiment of the antenna 10, while FIG. 5 shows the corresponding bottom view of the same antenna 10. Conducting areas of antenna 10 are shown as hatched when visible in the respective view and as outlined with a dashed line when located on the (hidden) side in the respective view.

The antenna 10 of FIGS. 4 and 5 comprises a substrate 13 with a first side 131 and a second side 132. On the first (top) side 131 there is shown a first driven element or monopole conductor 11 with a first signal feeding line 14 merging into or coupled to monopole conductor 11 at the feeding point 141. Further shown on the first side 131 is a connection to the ground potential of the antenna 10, referred to as the second ground conductor 16, which may be a strip of conducting material along or parallel to one edge of the first side 131, e.g. to the left or the right of the monopole conductor 11 extending to an inner border 160. Also indicated on side 131 are the inner circumference d1 and the outer circumference d2 of a first ground conductor as dashed lines as the first ground conductor 12 is mounted onto the other (bottom) side 132 of the substrate 13.

Together with the first ground conductor 12 there is mounted on the second side 132 of the substrate 13, a second signal feeding line 15 connecting to the first ground conductor 12 at a feeding point 151. Also connected to the first ground conductor 12 is a ground connector 125, which may by a strip of conductive material connecting the ground conductor to an edge of the substrate (and further via connectors or pins not shown to the ground potential of the antenna 10).

A feeding point, be it the first feeding point 141 or the second feeding point 151 may denote the approximate area where the signal feeding lines 14, 15 merge/widen into the monopole conductor 11 and into the area first ground conductor 12, respectively.

The substrate 13 is generally made of a dielectric material. The substrate 13 and its dimensions, particularly its thickness, are chosen depending on the desired application. The electromagnetic properties of the substrate 13, especially its permittivity, influence also the characteristics of the antenna 10. Therefore, the properties of the substrate 13 must be considered when choosing other design parameters of the antenna. The substrate 13 in the example may be a thin planar rectangular cuboid or parallelepiped, such as a flat sheet or board, with facing main sides or faces 131, 132. Preferably, the first side 131 and the second side 132 are parallel to each other and/or flat. However, the substrate 13 may also be a curved shape for specific applications. In the illustrated embodiment, the substrate 13 may be a rigid plate, for example with a constant thickness. However, the substrate 13 may also be a flexible material like a foil and/or could be of varying thickness. The thickness of the substrate 13 refers to the separation distance between the first side 131 and to the second side 132.

As indicated in FIGS. 4 and 5, the first driven element or monopole conductor 11 on side 131 may be an extended area covered with a solid or at least a continuous layer of conducting material. In particular, the monopole conductor 11 may be a solid approximately disk-shaped area as shown, but other shapes may be contemplated. In should be noted that the term "monopole" is used herein not exclusively as a strict technical term but as a term to encompass all types of compact driven antenna elements of which monopoles have the most wide spread usage. Compact dipole or more complicated antenna elements with more parasitic satellites may also be used as the monopole conductor 11.

Hence, the shape of the monopole conductor 11 is not limited to circular, as will be clear to a person skilled in the art. It can be ellipsoidal, triangular, rectangular, multi-angular, fractal, or any other shape. For example, the outer circumference d0 of the monopole conductor 11 can be shaped similar to one of the outer circumference d2 and/or the inner circumference d1 of the first ground conductor 12. The shape of the monopole conductor 11 may also differ from the ground conductor 12. The area of the first monopole conductor 11 and thus the size of its outer circumference d0 is best chosen such that it falls within the projection of the inner circumference d1 of the first ground conductor 12.

The first ground conductor 12 comprises an electrically conducting material deposited as a layer onto the second side 132 of the substrate 13. The first ground conductor 12 on the opposite side 132 may be an extended area covered with a solid or at least a continuous layer of conducting material. As explained in detail below the area covered by the first ground conductor 12 may enclose a central or inner area free of conducting material. The first ground conductor 12 is approximately annular. It will be appreciated by a person skilled in the art that any other shape of the first ground conductor 12, which substantially encloses a central area of the surface 132 can be used. The enclosed area could be an ellipsoidal, a triangular, a rectangular, a multi-angular or any other approximately or nearly closed shape.

In the shown embodiment, the first ground conductor 12 is defined by two concentric circular borders with an inner circumference d1 and an outer circumference d2, respectively. Hence, the first ground conductor 12 may be essentially ring-shaped. When used as the driven element of the antenna 10, the first ground conductor 12 may be regarded as a ring antenna element.

The monopole feeding line 14, the second signal feeding line 15 and the ground connector 125 are made of electrically conducting material and are connected on their near end to the monopole conductor 11 and the first ground conductor 12, respectively and on their far end to structures and elements beyond the elements of the antenna 10 as shown in FIGS. 4 and 5, in particular to signal ports and ground potential, respectively The antenna 10 characteristics, for example the input impedance or the reflection coefficient, depend, among other things, on the thickness of the substrate 13, the electromagnetic properties of the substrate 13 and the geometrical arrangement and shapes of the ground conductor 12 and the monopole conductor 11. In the example shown, the parameters of the geometrical arrangement are, inter alia, d0, d1 and d2. Electromagnetic properties of the substrate 13 include, for example, the permittivity, permeability, and loss tangent.

Whilst the various conductive elements or structures in FIG. 4 and FIG. 5 are mounted on both sides 131, 132 of the substrate 13, certain constraints as to their placement relative to each other may be applied to optimize the performance of the antenna 10.

One of such constraints may be that the first and the second signal feeding lines 14, 15 are oriented essentially perpendicular, at an angle of 80 to 100 degrees, or even at an angle of 85 to 95 degrees, in reference to their respective axis extending approximately from the centre of the monopole conductor 11 and the first ground conductor 12, respectively. In other words, if one of the signal feeding lines, e.g. feeding line 14 is formed as a narrow strip of conductive material located essentially at the middle of one edge of the substrate 13, the second signal feeding line 15 may be a similar strip located essentially at the middle of one of the two adjacent edges of the substrate (besides being located on the opposite side of the substrate). The feeding lines 14, 15 are essentially perpendicular in order to yield two orthogonal polarizations and thus achieve a desirable isolation between the two signal feeding lines 14, 15 (and hence signal input ports of the antenna 10).

Further, the first ground conductor 12 on the bottom side 132 of the substrate 13 may have an inner circumference d1 enclosing an area free of parts of the first ground conductor 12 which fully encloses an outer circumference d0 of the monopole conductor 11 located on the other (top) side 131 of the substrate 13.

Another constraint may be that the second ground conductor 16 and the second signal feeding line 15 are located at the same edge of the substrate 13 (albeit on different sides).

Another constraint may be that the second ground conductor 16 may extend in direction from an edge of the substrate 13 towards the middle of the substrate 13 up to a border line 160 without however such border line 160 touching or overlapping with the outer diameter d2 of the first ground conductor 12, as projected onto the first side 131 and indicated by the dashed line in FIG. 4, for example.

Another constraint may be that the feeding point 141 is close to or even inside the inner diameter d1 of the first ground conductor 12, as projected onto the first side 131 and indicated by the dashed line in FIG. 4, for example.

For example, the input impedance at the feeding point 141 or at the feeding point 151 may be designed to match a desired impedance. The desired impedance is typically selected to match the transmitting and/or receiving circuitry (not shown). Values often used are, for example, 50 Ohm or 75 Ohm.

It may be desirable to operate antenna 10 as two essentially independent (sub-)antennas, particularly as two antennas with a mutually cross-polarized reception/transmission characteristics. The first of such (sub-)antennas may be formed by the first monopole conductor 11 with the first monopole feeding line 14 and the first ground conductor 12. The second of such antennas may be formed by the first ground conductor 12 with the second monopole feeding line 15, operating as a ring antenna with a parasitic element and the second ground conductor 16.

In other word the above example describes a compact antenna which can be designed and operated as two (sub-) antennas with at least part of the ground of one (sub-) antenna acting as driven element of the second (sub-) antenna.

A possible operation of the antenna 10 as a system of two (sub-)antennas is further illustrated in FIG. 6. FIG. 6 shows a detail of the feeding point area 151 of FIG. 5. The first ground conductor 12, the feeding point 151, and the second signal feeding line 15 may be substantially similar to those elements described in FIGS. 4 and 5. In FIG. 6, there is shown a section of the first ground conductor 12, the second signal feeding line 15, and the feeding point 151. Further shown are currents I0, I1, I2 which are generated by operation of the first (sub-) antenna formed by the monopole conductor 11 with the first signal feeding line 14 and the first ground conductor 12. The current I0 induced splits at the feeding point 151 in accordance to the impedance Z1 in the first ground conductor 12 and the impedance Z2 at the feeding point 151 of the second monopole feeding line 15.

The above configuration may be operated desirably with the materials, locations and dimensions of the above described structure designed such that for any current I0 flowing in the first ground conductor 12 as generated by operation of the first (sub-)antenna with the first ground conductor 12 acting as ground has a substantially higher impedance Z2 for electrical current at the feeding point 151 through the signal feeding line 15 than the complex impedance Z1 in the rest of the ground conductor 12. The current I0 is then effectively confined within the ground conductor 12 without leaking into the second monopole feeding line 15. In other words the current I2 is negligible compared to both the total current I0 and the current I1 after the node at the feeding point 151 with I0=I1+I2. For the signal applied to feeding line 15 the impedance is designed to be the nominal input impedance, e.g. 50 Ohm, while the magnitude of the impedance Z1 can, for example, be around 0.01 Ohm.

When driving or feeding the first ground conductor 12 as a ring antenna via the second signal feeding line 15, the second ground conductor 16 acts as ground for the second feeding line 15 and the first ground conductor 12. The radius of the first ground conductor 12, its dimensions and the position and dimensions of the ground connector 125 may be designed such that in the given operating frequency range the ground connector 125 appears as an open circuit, i.e. having an odd numbered multiple of a quarter of the wavelength of the RF wave at the location of the ground connector (in both directions around the first ground connector 12 as being effectively a ring antenna).

In addition, the second signal feeding line 15 is typically coupled capacitively or inductively to the interior monopole antenna 11 (on the other side 131 of the substrate 13). This coupling aids at shrinking the total size of the antenna or at partially removing the impact of the first ground conductor 12 on the monopole conductor 11 when exciting the first signal feeding line or signal input port 14 and thus achieving wider bandwidth. However, a small portion of induced current will flow through line 14. The amount of current thus leaking through line 14 can be taken as indicator of the isolation between the two signal feeding lines or input ports 14, 15. Depending on the general design parameter mentioned above, it is for example possible to achieve better than 30 dB isolation between the input ports within a wide bandwidth of around 2.0-2.7 GHz. For frequency ranges 1.7 GHz-2.0 GHz the isolation can still be better than 22 dB.

It was further found that isolation of signal input port 15 across a broader range of frequencies can be further improved by adding blind or parasitic conductive path extensions to the ground conductor 12 on the bottom side 132 of the antenna 10.

Figure 7A:
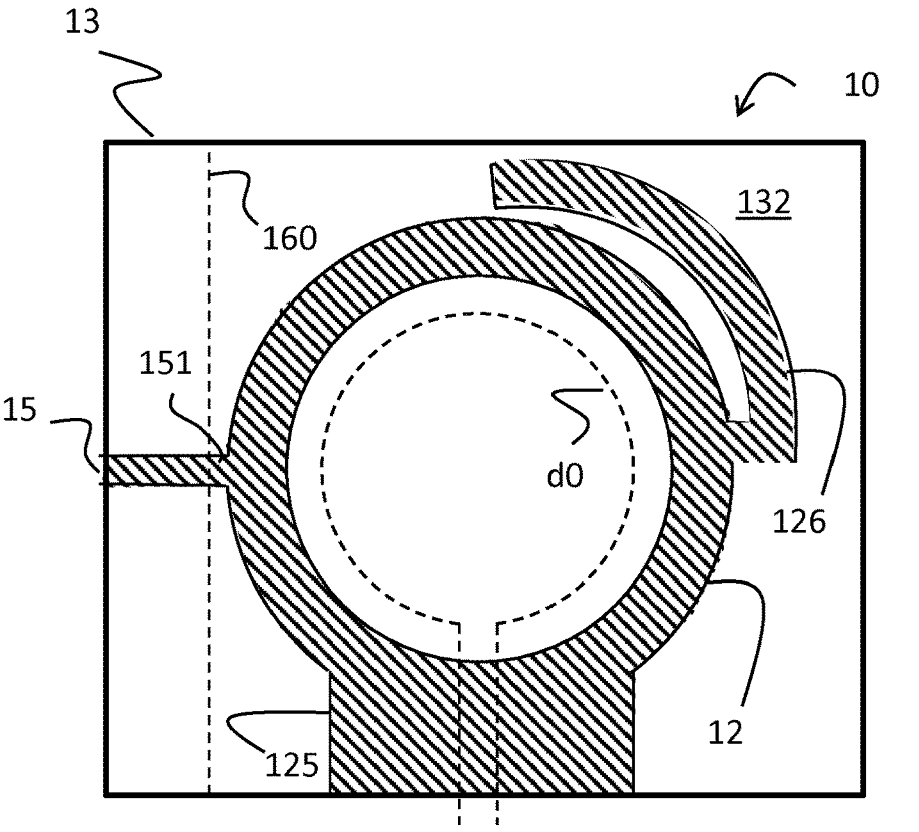
FIGS. 7A, B show bottom views of antennas according to further examples of the invention.
Figure 7B:
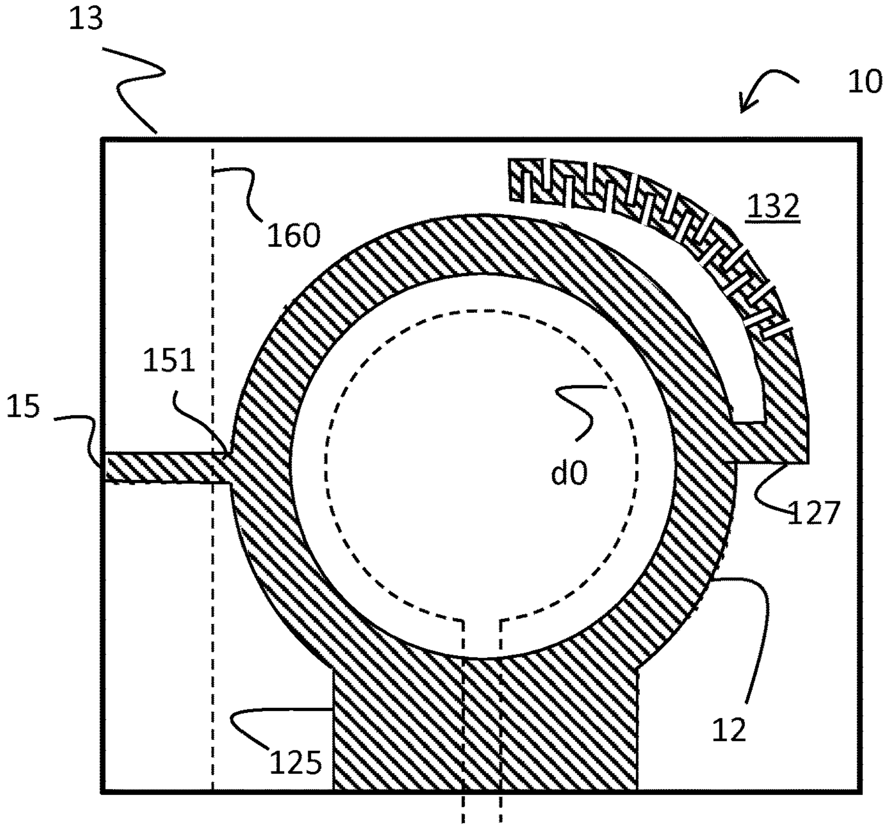

In the examples of FIGS. 7A, 7B there is shown a first ground conductor 12 mounted on the second side 132 of a substrate 13, a second signal feeding line 15 connecting to the first ground conductor 12 at a feeding point 151. Also connected to the first ground conductor 12 is a ground connector 125, which may by a strip of conductive material connecting the ground conductor to an edge of the substrate (and further via connectors or pins not shown to the ground potential of the antenna 10). In addition, the ground conductor 12 further includes a conductive path extension 126. The conductive path extension 126 as shown in FIG. 7A can be a strip of conductive material branching off the outer circumference of the ground conductor 12 as a blind extension or parasitic element.

The location at which the conductive path extension 126 is connected to the ground conductor 12 may be located essentially opposite of the feeding point 151, e.g. within 160 to 200 degrees along the circumference of the ground conductor 12 from the feeding point 151.

The conductive path extension 127 as shown in FIG. 7B can be further extended compared to the conductive path extension 126 of FIG. 7A by including a meandering strip of conductive material.

The path extension may also be realised internally within the ground conductor 12, for example by giving sections of the ground conductor 12 a meandering form instead of the solid form shown.

The ground conductor 12 may further include an isolating gap (not shown) particularly at the location of the conductive path extension 126, 127, with the gap splitting the ground conductor 12 into two branches.

While various embodiments of the present invention have been described above, it should be understood that they have been presented by way of example only, and not of limitation. Likewise, the various diagrams may depict an example structure or other configuration for the invention, which is done to aid in understanding features and functionality that can be included in the invention. Further, it should be understood that the various features, aspects and functionality described in one or more of the individual embodiments are not limited in their applicability to the particular embodiment with which they are described, but instead can be applied, alone or in various combinations, to one or more of the other embodiments of the invention. In particular, where approximative terms such as "essential" are used it is understood that minor variations within for example 10 percent or less from a strict geometrical shape or orientation are included.

The invention claimed is:

1. A system comprising:

a planar antenna that comprises a substrate, a monopole conductor, a first ground conductor, and a second ground conductor, wherein:

the monopole conductor is connected to a first signal feeding line;

the first ground conductor is connected to ground potential;

the first ground conductor is further connected to a second signal feeding line;

the second ground conductor is connected to ground potential; and the second ground conductor is located on a side of the substrate.

2. The system according to claim 1, wherein the planar antenna is configured to transmit and receive radiation in two mutually cross-polarized modes.

3. The system according to claim 1, wherein the first signal feeding line and the second signal feeding line are configured such that they are oriented orthogonal to each other.

4. The system according to claim 1, wherein the planar antenna is configured such that a current flowing through the first ground conductor into the second signal feeding line at a feeding point is substantially higher than a current flowing through the first ground conductor.

5. The system according to claim 1, wherein the first ground conductor comprises a ring of conductive material.

6. The system according to claim 1, wherein the monopole conductor comprises a circular conducting structure.

7. The system according to claim 6, wherein an outer diameter of the monopole conductor is smaller than an inner diameter of the first ground conductor, such that the monopole conductor is fully enclosed by the first ground conductor, when vertically projected onto the same surface.

8. The system according to claim 1, wherein the second ground conductor comprises a strip of conducting material located along one of two edges of the substrate, adjacent and/or orthogonal to the edge of the substrate with the first signal feeding line.

9. The system according to claim 8, wherein the second ground conductor extends in a direction from an edge of the substrate towards a middle of the substrate 13, up to a border line, without the border line touching or overlapping with the outer diameter of the first ground conductor.

10. The system according to claim 1, wherein the first and second signal feeding lines are configured to have a same nominal input impedance.

11. The system according to claim 1, wherein the planar antenna operates as a plurality of sub-antennas.

12. The system according to claim 11, wherein during operation of the planar antenna, at least:

the monopole conductor with the first signal feeding line and the first ground conductor form a first sub-antenna; and the first ground conductor with the second signal feeding line form a second sub-antenna for emitting and receiving two mutually cross-polarized signals.

13. The system according to claim 12, wherein during operation of the planar antenna, the first sub-antenna and the second sub-antenna are configured to emit and receive two mutually cross-polarized signals.

14. The system according to claim 11, wherein the monopole conductor with the first signal feeding line and the first ground conductor form a monopole antenna and wherein the first ground conductor with the second signal feeding line form a ring-antenna.

15. The system according to claim 1, wherein the planar antenna is configured as a wideband antenna.

16. The system according to claim 1, wherein the first ground conductor is connected to ground potential through a ground connector.

* * * * *